US012242296B1

(12) United States Patent
Lau

(10) Patent No.: US 12,242,296 B1
(45) Date of Patent: Mar. 4, 2025

(54) MULTIDIRECTIONAL SWITCH ACTIVATION DEVICE

(71) Applicant: Shui Lau, Lewis Center, OH (US)

(72) Inventor: Shui Lau, Lewis Center, OH (US)

( * ) Notice: Subject to any disclaimer, the term of this patent is extended or adjusted under 35 U.S.C. 154(b) by 107 days.

(21) Appl. No.: 18/097,309

(22) Filed: Jan. 16, 2023

(51) Int. Cl.
*H01H 13/14* (2006.01)
*G05G 1/02* (2006.01)
*G05G 1/04* (2006.01)

(52) U.S. Cl.
CPC ................. *G05G 1/02* (2013.01); *G05G 1/04* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

2015/0213975 A1* 7/2015 Zheng .................... H01H 13/80 200/5 A
2022/0236759 A1* 7/2022 Gorai ....................... G05G 1/06
2022/0246374 A1* 8/2022 Gorai ..................... H01H 25/04

* cited by examiner

*Primary Examiner* — Ahmed M Saeed
(74) *Attorney, Agent, or Firm* — Shaddock Law Group, PC

(57) ABSTRACT

A multidirectional switch activation device, including a control button and an activation disc, and wherein a control button second end is attached or coupled to at least a portion of the activation disc first end; and a button housing, wherein a button housing disc cavity extends to a button housing disc cavity shoulder and a button housing button cavity extends from the button housing disc cavity shoulder to a button housing first end, wherein the button housing disc cavity shoulder protrudes into the button housing disc cavity, wherein the activation disc is positioned within the button housing disc cavity such that at least a portion of the activation disc first end of the activation disc may contact the button housing disc cavity shoulder, and wherein the control button and the activation disc are repeatably slidable relative to the button housing between a deactivated position and an activated position.

20 Claims, 10 Drawing Sheets

MULTIDIRECTIONAL SWITCH ACTIVATION DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE DISCLOSURE

1. Field of the Disclosure

The present disclosure relates generally to the field of switch activation devices and is particularly directed to an improved switch activation device that allows for multidirectional activation of a pushbutton switch.

2. Description of Related Art

It is well known to use pushbutton switches to turn various accessories on and off. Typically, when a sufficient urging force is appropriately applied to a pushbutton switch, the switch activates the accessory, i.e., causes the flashlight to illuminate. When the urging force is removed from the pushbutton switch, the switch either remains on or deactivates the accessory.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY AND OBJECTS OF THE DISCLOSURE

Unfortunately, with known pushbutton switches, the sufficient urging force must be applied in a discrete direction, i.e., parallel to the longitudinal axis or direction of motion of the pushbutton switch. If an urging force is applied from another direction, the pushbutton switch fails to activate or deactivate.

These and other disadvantages of the prior art are overcome with the present disclosure, wherein the multidirectional switch activation device provides a button assembly, having a control button that allows a pushbutton switch to be activated by the application of an urging force, whether the urging force is applied to the control button parallel to the longitudinal axis or direction of motion of the pushbutton switch or from another direction.

In various exemplary embodiments, the multidirectional switch activation device provides a removable activation device, which mechanically increases or changes the direction from which pressure can be applied to activate the switch.

In certain exemplary embodiments, the multidirectional switch activation device may optionally be utilized as a switcher tail cap for a flashlight. However, it should be appreciated that the multidirectional switch activation device may be utilized as a switch activation device in any desired application.

The present disclosure utilizes a control button having an activation disc that can be urged against a pushbutton switch to activate the switch.

In various exemplary embodiments of the present disclosure, a switch or pushbutton switch is included. Alternatively, the switch is not included, and the multidirectional switch activation device of the present disclosure is utilized in connection with an existing, host switch.

The control button and activation disc utilize leverage to actuate or activate it the host switch. Sideways manipulation of the control button (movement other than parallel to the longitudinal axis, $A_L$, or direction of motion of the switch) urges or "tilts" the activation disc. The tilting motion moves at least one edge portion of the activation disc towards the switch, activating the switch. Because the edge portion of the activation disc is substantially circular or round, the activation disc is able to supply and urging force to the switch no matter which way the control button is moved, including directly forward.

In order to overcome the shortcomings of the currently known switch arrangements and/or to provide an improved switch activation device, in various exemplary, non-limiting embodiments, the multidirectional switch activation device of the present disclosure provides at least some of a control button, wherein a button head portion of the control button extends from a control button first end to a control button transition shoulder portion of the control button, wherein a control button transition shoulder portion of the control button extends from the button head portion to a control button neck portion, and wherein the control button neck portion extends from the control button transition shoulder portion to a control button second end; an activation disc, wherein the activation disc extends from an activation disc first end to an activation disc second end, wherein the activation disc second end includes an arced or radiused surface, and wherein the control button second end is attached or coupled to at least a portion of the activation disc first end; a button housing, wherein the button housing extends from a button housing first end to a button housing second end, wherein a button housing disc cavity extends from the button housing second end to a button housing disc cavity shoulder, wherein a button housing button cavity extends from the button housing disc cavity shoulder to the button housing first end, wherein a button housing button cavity side wall extends from the button housing first end toward the button housing disc cavity shoulder, wherein the button housing disc cavity shoulder protrudes into the button housing disc cavity to provide a reduced diameter aperture extending from the button housing disc cavity shoulder to the button housing first end, wherein the activation disc is positioned within the button housing disc cavity such that at least a portion of the activation disc first end of the activation disc may contact the button housing disc cavity shoulder such that the activation disc is not permitted to pass beyond the button housing disc cavity shoulder, wherein the control button and the activation disc are repeatably slidable relative to the button housing and the activation disc is repeatably slidable within the button housing disc cavity between a deactivated position wherein at least a portion of the activation disc first end of the activation disc contacts or is proximate the button housing disc cavity shoulder and an activated position wherein the activation disc first end of the activation disc is urged away from the button housing disc cavity shoulder toward the button housing second end, and wherein the control button, the activation disc, and the button housing form a button assembly; and a switch housing including a switch, wherein the switch housing is attached or coupled to the button housing proximate the button housing second end such that if the control button and the activation disc are in the deactivated position the activation disc second end of the activation disc does not activate the switch and if the control button and the activation disc are in the activated position at least a portion of the activation disc second end of the activation disc activates the switch.

In various exemplary, non-limiting embodiments, the button assembly converts lateral movement of the control button to forward movement of at least a portion of the activation disc.

In various exemplary, non-limiting embodiments, the control button second end is attached or coupled to at least a portion of the activation disc first end via a fastener.

In various exemplary, non-limiting embodiments, the control button includes one or more surface extensions, wherein each surface extension is formed so as to engage a portion of the button housing to restrict movement of the control button relative to the button housing.

In various exemplary, non-limiting embodiments, the activation disc has a substantially circular cross-section.

In various exemplary, non-limiting embodiments, the activation disc first end has a substantially planar surface.

In various exemplary, non-limiting embodiments, the multidirectional switch activation device includes two or more activation discs, each activation disc having a different characteristic or activation disc second end profile.

In various exemplary, non-limiting embodiments, the activation disc second end extends to the activation disc first end.

In various exemplary, non-limiting embodiments, the control button and the activation disc are formed as a single, integrally formed element. formed as a monolithic or unitary body, a one-piece article, or an integral unit.

In various exemplary, non-limiting embodiments, at least a portion of the control button second end and at least a portion of the activation disc first end are attached or coupled together via an adhesive.

In various exemplary, non-limiting embodiments, the button housing disc cavity is defined between an open portion extending from the button housing second end, one or more button housing disc cavity sidewalls, and the button housing disc cavity shoulder.

In various exemplary, non-limiting embodiments, the button housing button cavity side wall comprises a conically tapered or countersunk sidewall.

In various exemplary, non-limiting embodiments, movement of the control button parallel to a longitudinal axis of the button assembly urges at least a portion of the activation disc second end toward the button housing second end.

In various exemplary, non-limiting embodiments, lateral movement of the control button relative to a longitudinal axis of the button assembly urges at least a portion of the activation disc second end toward the button housing second end.

In various exemplary, non-limiting embodiments, the button assembly and the switch housing are formed as a monolithic or unitary body, a one-piece article, or an integral unit.

In various exemplary, non-limiting embodiments, in the activated position at least a portion of the activation disc first end of the activation disc contacts the button housing disc cavity shoulder.

In various exemplary, non-limiting embodiments, if the control button and the activation disc are in the deactivated position at least a portion of the activation disc second end of the activation disc contacts the switch.

In various exemplary, non-limiting embodiments, a biasing force of the switch provides a measure of return force to the activation disc, to urge the control button and the activation disc to the disengaged position.

In various exemplary, non-limiting embodiments, the multidirectional switch activation device of the present disclosure provides at least some of a control button, wherein the control button extends from a control button first end to a control button second end; an activation disc, wherein the activation disc extends from an activation disc first end to an activation disc second end, wherein the activation disc second end includes an arced or radiused surface, and wherein the control button second end is attached or coupled to at least a portion of the activation disc first end; a button housing, wherein the button housing extends from a button housing first end to a button housing second end, wherein a button housing disc cavity extends from the button housing second end to a button housing disc cavity shoulder, wherein a button housing button cavity extends from the button housing disc cavity shoulder to the button housing first end, wherein the button housing disc cavity shoulder protrudes into the button housing disc cavity, wherein the activation disc is positioned within the button housing disc cavity such that at least a portion of the activation disc first end of the activation disc may contact the button housing disc cavity shoulder, and wherein the control button and the activation disc are repeatably slidable relative to the button housing and the activation disc is repeatably slidable within the button housing disc cavity between a deactivated position wherein at least a portion of the activation disc first end of the activation disc contacts or is proximate the button housing disc cavity shoulder and an activated position wherein the activation disc first end of the activation disc is urged away from the button housing disc cavity shoulder toward the button housing second end; and a switch housing including a switch, wherein the switch housing is attached or coupled to the button housing proximate the button housing second end such that if the control button and the activation disc are in the deactivated position the activation disc second end of the activation disc does not activate the switch and if the control button and the activation disc are in the activated position at least a portion of the activation disc second end of the activation disc activates the switch.

In various exemplary, non-limiting embodiments, the multidirectional switch activation device of the present disclosure provides at least some of a control button, wherein the control button extends from a control button first end to a control button second end; an activation disc, wherein the activation disc extends from an activation disc first end to an activation disc second end, and wherein the control button second end is attached or coupled to at least a portion of the activation disc first end; and a button housing, wherein the button housing extends from a button housing first end to a button housing second end, wherein a button housing disc cavity extends from the button housing second end to a button housing disc cavity shoulder, wherein a button housing button cavity extends from the button housing disc cavity shoulder to the button housing first end, wherein the button housing disc cavity shoulder protrudes into the button housing disc cavity, wherein the activation disc is positioned within the button housing disc cavity such that at least a portion of the activation disc first end of the activation disc may contact the button housing disc cavity shoulder, and wherein the control button and the activation disc are repeatably slidable relative to the button housing between a deactivated position wherein at least a portion of the activation disc first end of the activation disc contacts or is proximate the button housing disc cavity shoulder and an activated position wherein the activation disc first end of the activation disc is urged away from the button housing disc cavity shoulder.

Accordingly, the present disclosure separately and optionally provides an improved switch activation device.

The present disclosure separately and optionally provides an improved switch activation device that allows a switch to be activated or actuated by an urging force that is parallel to a direction of motion of the switch or is other than parallel to the direction of motion of the switch.

The present disclosure separately and optionally provides a multidirectional switch activation device that is solely mechanical and does not require a current or power supply to operate.

The present disclosure separately and optionally provides a multidirectional switch activation device that does not electrically "sense" or detect a direction of movement but utilizes multidirectional movement to produce forward or longitudinal movement.

The present disclosure separately and optionally provides a multidirectional switch activation device that can be easily manipulated by a user.

The present disclosure separately and optionally provides a multidirectional switch activation device that can be retrofitted to an existing mechanical or electrical switch or valve.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may be discussed relative to certain embodiments and figures, all embodiments of the presently disclosed systems, methods, and/or apparatuses can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE DRAWINGS

As required, detailed exemplary embodiments of the present disclosure are disclosed herein; however, it is to be understood that the disclosed embodiments are merely exemplary of the present disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein.

DETAILED DESCRIPTION OF THE DISCLOSURE

Figure 1:
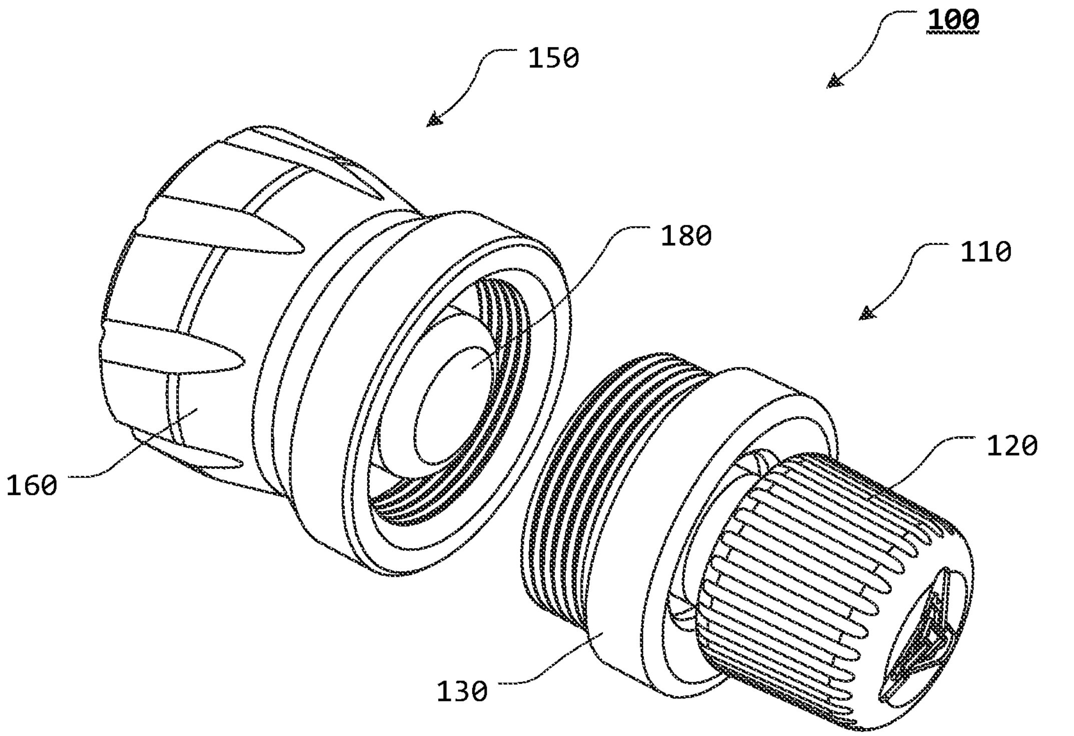
FIG. 1 illustrates a rear perspective view of certain exemplary, aligned components of an exemplary embodiment of a multidirectional switch activation device according to the present disclosure.
Figure 2:
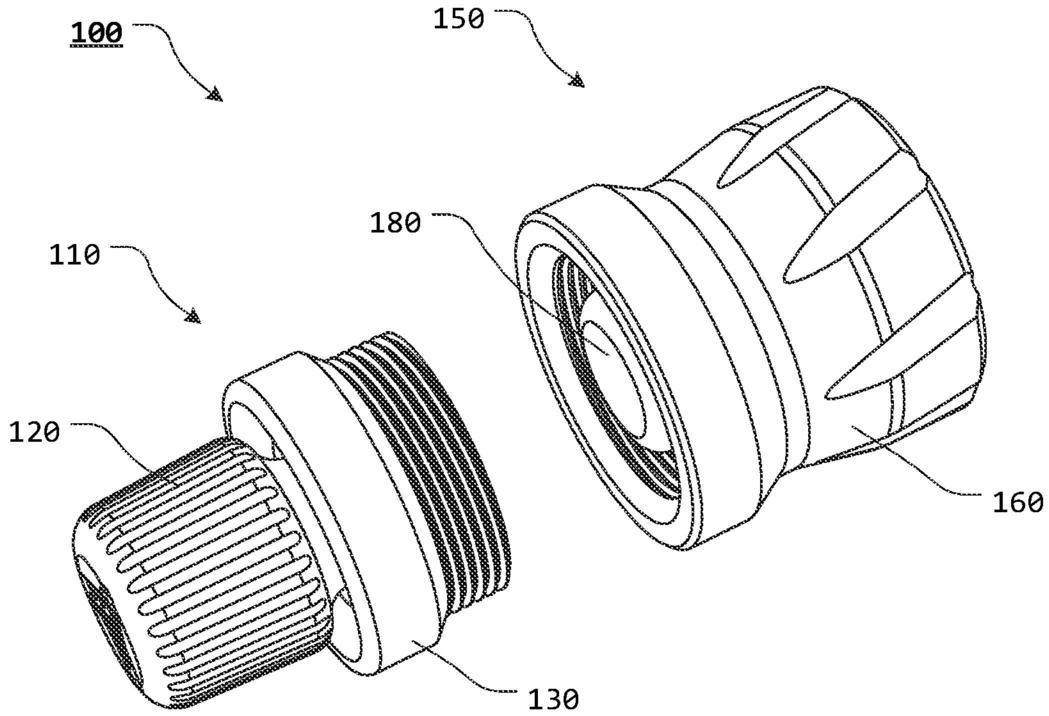
FIG. 2 illustrates a rear perspective view of certain exemplary, aligned components of an exemplary embodiment of a multidirectional switch activation device according to the present disclosure.
Figure 3:
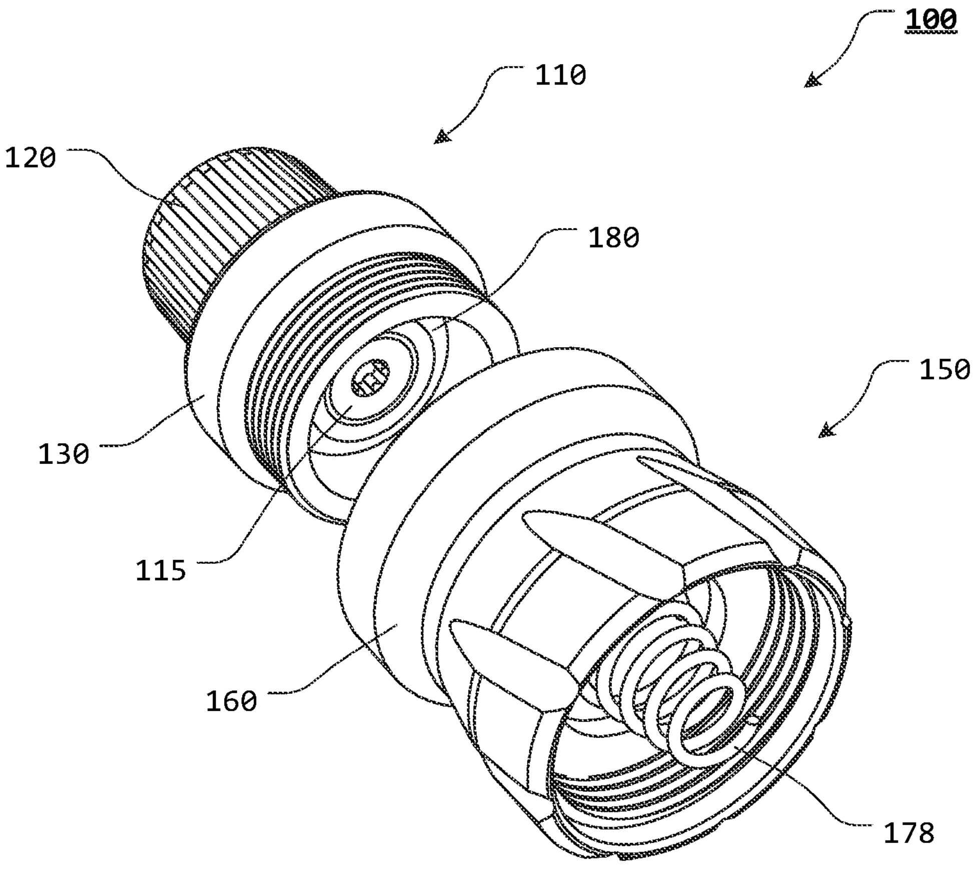
FIG. 3 illustrates a front perspective view of certain exemplary, aligned components of an exemplary embodiment of a multidirectional switch activation device according to the present disclosure.
Figure 4:
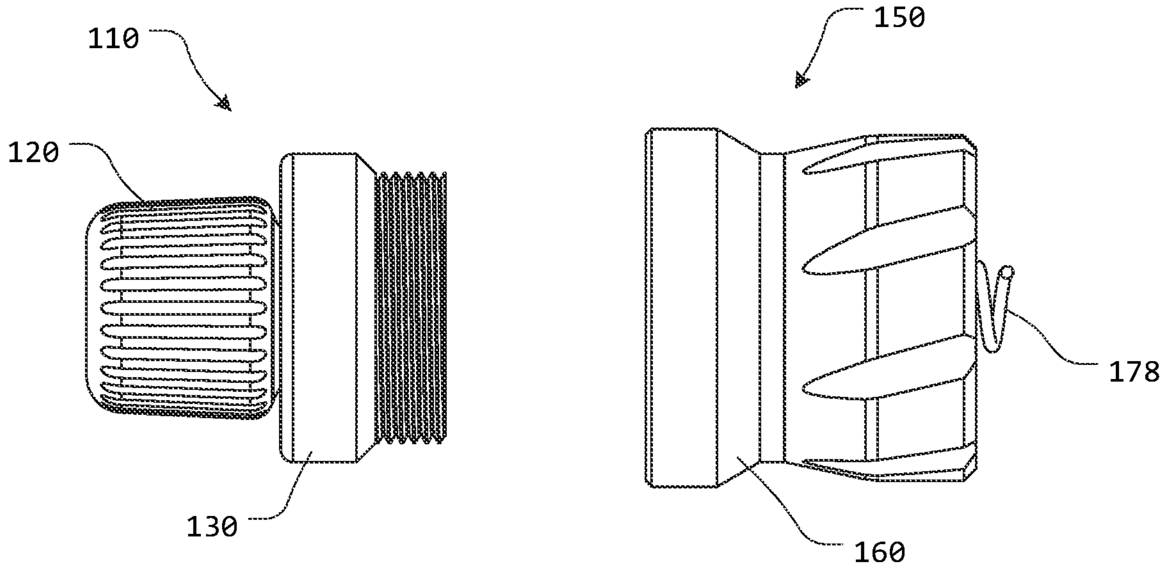
FIG. 4 illustrates a side view of certain exemplary, aligned components of an exemplary embodiment of a multidirectional switch activation device according to the present disclosure.
Figure 5:
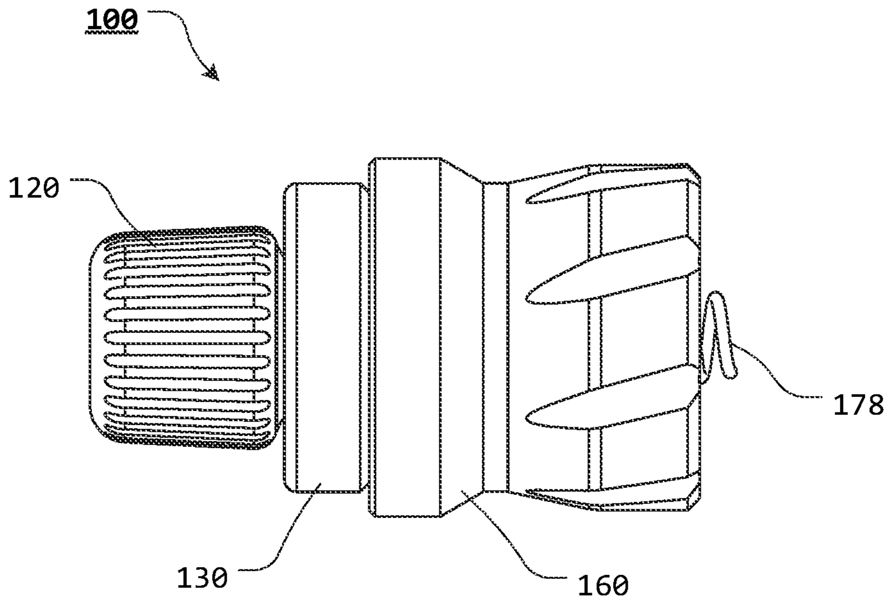
FIG. 5 illustrates a side view of certain exemplary, assembled components of an exemplary embodiment of a multidirectional switch activation device according to the present disclosure.
Figure 6:
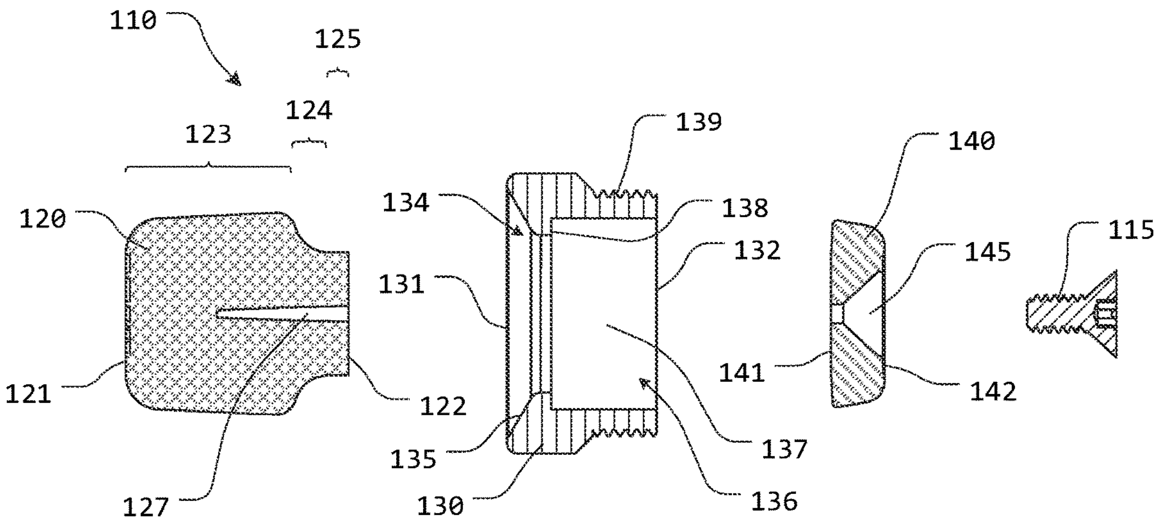
FIG. 6 illustrates an exploded, side, cross-sectional view of certain exemplary, aligned components of an exemplary embodiment of a button assembly according to the present disclosure.

The foregoing and other objectives, features, and advantages of the invention will be more readily understood upon consideration of the following description of the invention taken in conjunction with the accompanying drawings.

For simplicity and clarification, the design factors and operating principles of the multidirectional switch activation device according to the present disclosure are explained with reference to various exemplary embodiments of multidirectional switch activation device according to the present disclosure. The basic explanation of the design factors and operating principles of the multidirectional switch activation device is applicable for the understanding, design, and operation of the multidirectional switch activation device of the present disclosure. It should be appreciated that the multidirectional switch activation device can be adapted to many applications where a switch or a switch activation device is necessary or desirable.

As used herein, the word “may” is meant to convey a permissive sense (i.e., meaning “having the potential to”), rather than a mandatory sense (i.e., meaning “must”). Unless stated otherwise, terms such as “first” and “second” are used to arbitrarily distinguish between the elements such terms describe. Thus, these terms are not necessarily intended to indicate temporal or other prioritization of such elements.

As used herein, the word “may” is meant to convey a permissive sense (i.e., meaning “having the potential to”), rather than a mandatory sense (i.e., meaning “must”). Unless stated otherwise, terms such as “first” and “second”, “right” and “left”, “top” and “bottom”, “upper” and “lower”, and “horizontal” and “vertical” are used to arbitrarily distinguish between the exemplary embodiments and/or elements such terms describe. Thus, these terms are not necessarily intended to indicate temporal or other prioritization of such exemplary embodiments and/or elements.

As used herein, and unless the context dictates otherwise, the term “coupled” is intended to include both direct coupling (in which two elements that are coupled to each other contact each other) and indirect coupling (in which at least one additional element is located between the two elements). The term coupled, as used herein, is defined as connected, although not necessarily directly, and not necessarily mechanically. The terms “a” and “an” are defined as one or more unless stated otherwise.

Throughout this application, the terms “comprise” (and any form of comprise, such as “comprises” and “comprising”), “have” (and any form of have, such as “has” and “having”), “include”, (and any form of include, such as “includes” and “including”) and “contain” (and any form of contain, such as “contains” and “containing”) are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that “comprises”, “has”, “includes”, or “contains” one or more elements possesses those one or more elements but is not limited to possessing only those one or more elements. Similarly, a method or process that “comprises”, “has”, “includes” or “contains” one or more operations possesses those one or more operations but is not limited to possessing only those one or more operations.

It should also be appreciated that, for simplicity and clarification, certain embodiments of the present disclosure may be described using terms such as “front”, “back”, “rear”, “right”, “left”, “upper”, “lower”, “outer”, and/or “inner”. However, it should be understood that these terms are merely used to aid in understanding of the present disclosure are not to be construed as limiting the systems, methods, devices, and/or apparatuses of the present disclosure. Additionally, it should be appreciated that, unless otherwise stated, the design factors and operating principles of the presently disclosed multidirectional explosive disruptor system may optionally be used in a "mirror image" assembly, wherein elements shown and/or described as being included in or on an upper or identified side portion may optionally be included in or on a lower or other side portion. Alternatively, certain of the elements that are shown and/or described as being included in or on a back portion may optionally be included in or on a front portion, or vice versa.

It should also be appreciated that the terms "multidirectional", "switch activation device", and "switch" are used for basic explanation and understanding of the operation of the systems, methods, and apparatuses of the present disclosure. Therefore, the terms "multidirectional", "switch activation device", and "switch" are not to be construed as limiting the systems, methods, and apparatuses of the present disclosure.

Furthermore, it should be appreciated that, for simplicity and clarification, the embodiments of the present disclosure will be shown and/or described with reference to the button assembly being utilized in connection with an exemplary switch assembly that could optionally be implemented as a switching mechanism for a flashlight. However, it should be appreciated that the button assembly and the illustrated switch assembly are merely exemplary and are not to be construed as limiting the present disclosure. Thus, the multidirectional switch activation device and/or the button assembly of the present disclosure may be utilized in connection with a variety of switches or switch assemblies, including any movable electrical-type, contact switching, or any other known or later developed switching device or assembly.

In the form of the present disclosure chosen for purposes of illustration, FIGS. 1-14 illustrate various exploded, partially exploded, and/or assembled views of the exemplary components of the multidirectional switch activation device 100. FIGS. 15-20 illustrate various views of an exemplary embodiment of a control button 230, while FIGS. 21-26 illustrate various views of an exemplary embodiment of a control button 330, removed from an exemplary multidirectional switch activation device 100 and/or an exemplary button assembly 110.

In illustrative, non-limiting embodiment(s) of the present disclosure, as illustrated in FIGS. 1-14, the multidirectional switch activation device 100 comprises at least some of a button assembly 110 and optionally a switch assembly 150 (generally in the form of an exemplary flashlight tail cap). It should be appreciated that the multidirectional switch activation device 100 may optionally only include an exemplary form of the button assembly 110 formed so as to be attached or coupled to an existing "host" switch or switch assembly. Thus, the multidirectional switch activation device 100 may be implemented or utilized in connection with a switch assembly, such as, for example, the switch assembly 150, as illustrated and described herein, or with any switching application or as part of any other known or later developed switch, switch assembly, or switching device.

In various exemplary embodiments, the button assembly 110 optionally comprises at least some of a control button 120, a button housing 130, an activation disc 140, and a fastener 115.

The control button 120 comprises a control button body that extends from a control button first end 121 to a control button second end 122. A button head portion 123 extends from the control button first end 121 to a control button transition shoulder portion 124. The control button transition shoulder portion 124 extends from the button head portion 123 to a control button neck portion 125. The control button neck portion extends from the control button transition shoulder portion 124 to the control button second end 122.

In various exemplary embodiments, a button recess 127 optionally extends from the control button second end 122 into the control button 120. The button recess 127, if included, is formed so as to interact with at least a portion of an externally threaded portion of a fastener 115.

The control button 120, and, more specifically, the button head portion 123, is formed so as to allow a user to interact with the multidirectional switch activation device 100, via the control button 120. The control button 120 provides one or more ergonomic surfaces that allow a user to engage one or more portions of the control button 120 in order to convert forward lateral movement of the control button 120 to forward movement of at least a portion of the activation disc 140.

The size, shape, and profile of the control button 120 are a design choice. In various exemplary embodiments, the control button 120 is generally in the shape of a rounded knob. However, it should be appreciated that the control button 120 may have various forms of shapes. The shape of the control button 120 (or portions of the button housing 130) may be altered to provide a different level of ergonomic contact or to limit the direction the control button 120 can move relative to the button housing 130, thereby limiting the motion that will activate the switch 170.

The shape and/or length of the control button transition shoulder portion 124 and the control button neck portion 125 can be formed so as to dictate optional directions of motion of the control button 120, including lateral and/or forward motion. For example, a length of the control button neck portion 125 can, at least in part, dictate the amount of forward and rearward movement of the control button 120 (movement along or parallel to the longitudinal axis, $A_L$, of the button assembly 110) by dictating the amount of travel of the control button 120 before at least a portion of the control button transition shoulder portion 124 contacts a portion of the button housing 130. The shape of the control button transition shoulder portion 124 can, at least in part, dictate the amount of forward and rearward movement or lateral movement (tilting movement or lateral movement relative to the longitudinal axis, $A_L$, of the button assembly 110) by dictating the amount of travel of the control button 120 before at least a portion of the control button transition shoulder portion 124 contacts a portion of the button housing 130.

For example, the control button 120 may optionally take the form of the control button 220, as illustrated in FIGS. 15-20. The control button 220 includes one or more surface extensions 229. Each surface extension 229 is formed so as to engage a portion of the button housing 130 to restrict the degree of movement of the control button 220 relative to the button housing 130. For example, if the multidirectional switch activation device 100 is utilized as a tail cap for a rifle mounted flashlight, use of the control button 120 would allow activation of the flashlight if the control button 120 is pushed or urged forward, up, down, left, or right. By utilizing the control button 220, the surface extension 229 would only allow the control button 220 to be moved in a single, up, direction. Thus, utilization of the control button 220 would allow the flashlight to only be activated when the control button 220 is urged up. The flashlight could no longer be activated by urging the control button 220 forward.

Alternatively, the control button 120 may optionally take the form of the control button 320, as illustrated, in FIGS.

21-26. The control button 320 provides one or more scalloped and/or textured portions and provides multidirectional movement of the control button 320 relative to the button housing 130.

Thus, it should be understood that the size, shape, and profile used to form the various surfaces of the control button 120, the control button 220, and/or the control button 320 is a design choice based on the desired appearance and functionality of the control button 120, the control button 220, and/or the control button 320.

The activation disc 140 includes an activation disc body that extends from an activation disc first end 141 to an activation disc second end 142. In various exemplary embodiments, the activation disc 140 has a substantially circular cross-section, when viewed from the activation disc first end 141 or the activation disc second end 142. In certain exemplary embodiments, the activation disc first end 141 has a substantially planar surface. However, it should be appreciated that this is exemplary and not limiting. The size, shape, and profile of the activation disc first end 141 is such that the control button second end 122 of the control button 120 is able to be matingly abutted against at least a portion of the activation disc first end 141.

In various exemplary embodiments, the activation disc second end 142 includes an arced or radiused surface that extends to the activation disc first end 141.

The activation disc 140 optionally includes an activation disc aperture 145 that extends through the activation disc body, from the from the activation disc first end 141 to the activation disc second end 142. The activation disc aperture 145 may include a conical taper as the activation disc aperture 145 extends from the from the activation disc first end 141. The activation disc aperture 145 is formed so as to allow at least a portion of a fastener 115 to be positioned therethrough.

Thus, in various exemplary embodiments, the activation disc 140 is attached or coupled to the control button 120 via the fastener 115 being positioned through the aligned activation disc aperture 145 and into at least a portion of the button recess 127. In various exemplary embodiments, the fastener 115 comprises a screw and interaction between at least a portion of an externally threaded portion of the fastener 115 and sidewalls of the button recess 127 act to attach or couple the activation disc 140 to the control button 120.

Depending on the profile of the surface of the activation disc second end 142, certain characteristics of the multidirectional switch activation device 100, such as, for example, the "sensitivity" of the control button 120 can be dictated, as the amount of movement of the activation disc 140 relative to the switch 170 can be adjusted.

By altering the thickness and/or shape of the activation disc 140, the amount of movement required of the control button 120 to contact and/or activate the switch 170 may be determined. The shape or profile of the activation disc may also allow the switch 170 to be "preloaded". For example, the profile of the activation disc 140 may be such that the switch 170 is at least partially depressed or activated when the control button 120 is in the off or disengaged position. In these examples, comparatively slight movement of the control button 120 will cause activation of the switch 170. In contrast, if there is a more prominent or significant gap between the activation disc second end 142 and the switch 170, when the control button 120 is in the off or disengaged position, a comparatively greater degree of movement of the control button 120 is required to cause activation of the switch 170.

In certain exemplary embodiments, one or more activation discs 140, each having a different characteristic or activation disc second end 142 profile may optionally be provided such that a user may releasably attach or couple a selected activation disc 140 to provide a desired characteristic to the button assembly 110 and the multidirectional switch activation device 100.

Thus, a user may optionally remove and/or replace the control button 120 and/or the activation disc 140 with an alternative control button and/or activation disc, or an alternative activation disc having an integral control button.

In various exemplary embodiments, the control button 120 and/or the activation disc 140 are substantially rigid and are formed of a plastic or polymer material. Alternate materials of construction of the control button 120 and/or the activation disc 140 may include one or more of the following: steel, stainless steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the control button 120 and/or the activation disc 140 is a design choice based on the desired appearance and functionality of button assembly 110.

Figure 14:
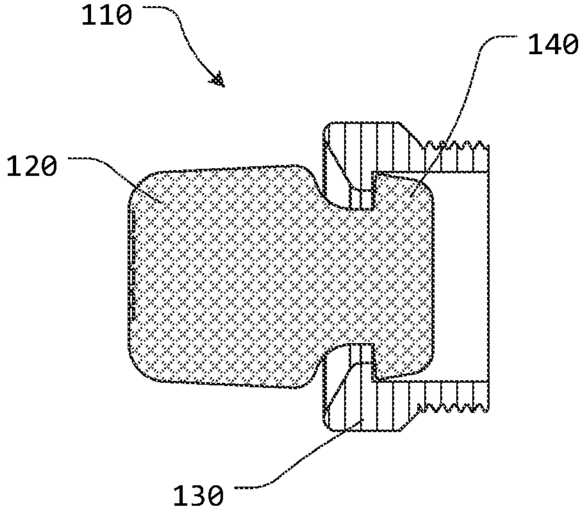
FIG. 14 illustrates a side, cross-sectional view of certain exemplary, assembled components of an exemplary embodiment of a multidirectional switch activation device according to the present disclosure.
Figure 15:
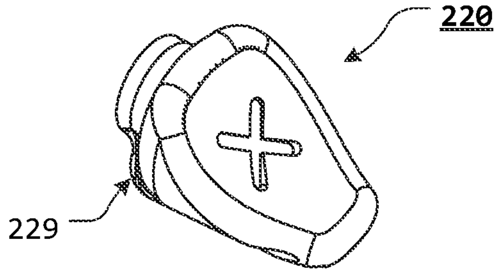
FIG. 15 illustrates a perspective view of an exemplary embodiment of a control button according to an exemplary embodiment of the present disclosure.
Figure 16:
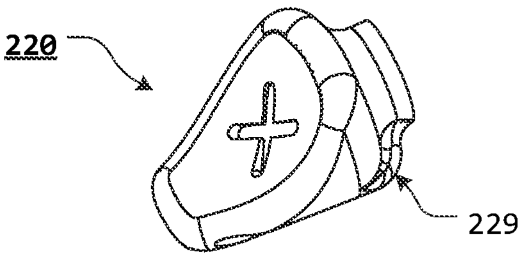
FIG. 16 illustrates a perspective view of an exemplary embodiment of a control button according to an exemplary embodiment of the present disclosure.
Figure 17:
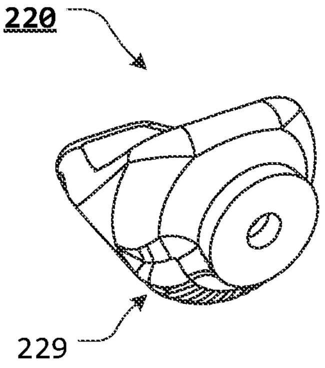
FIG. 17 illustrates a perspective view of an exemplary embodiment of a control button according to an exemplary embodiment of the present disclosure.
Figure 18:
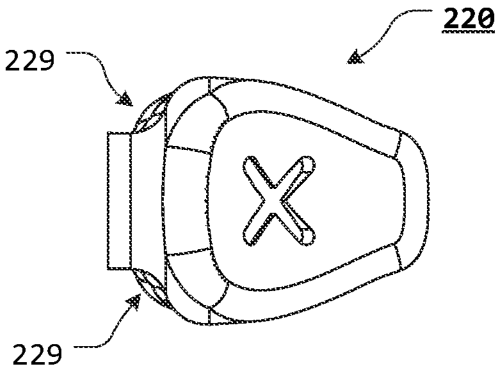
FIG. 18 illustrates a top view of an exemplary embodiment of a control button according to an exemplary embodiment of the present disclosure.
Figure 19:
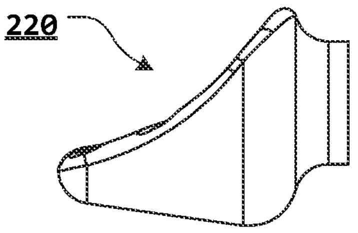
FIG. 19 illustrates a side view of an exemplary embodiment of a control button according to an exemplary embodiment of the present disclosure.
Figure 20:
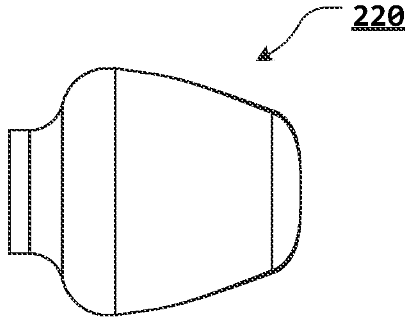
FIG. 20 illustrates a bottom view of an exemplary embodiment of a control button according to an exemplary embodiment of the present disclosure.
Figure 21:
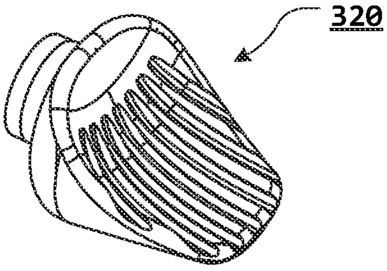
FIG. 21 illustrates a perspective view of an exemplary embodiment of a control button according to an exemplary embodiment of the present disclosure.
Figure 22:
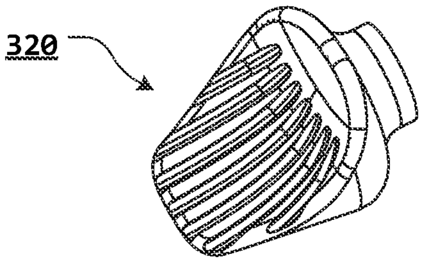
FIG. 22 illustrates a perspective view of an exemplary embodiment of a control button according to an exemplary embodiment of the present disclosure.
Figure 23:
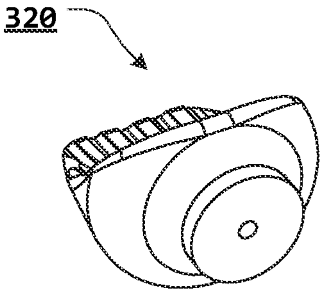
FIG. 23 illustrates a perspective view of an exemplary embodiment of a control button according to an exemplary embodiment of the present disclosure.
Figure 24:
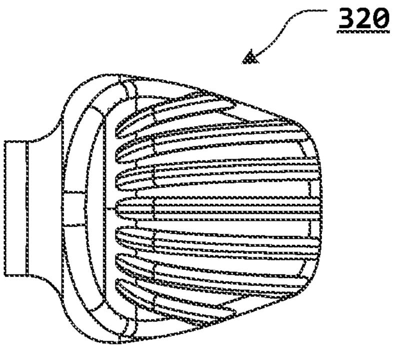
FIG. 24 illustrates a top view of an exemplary embodiment of a control button according to an exemplary embodiment of the present disclosure.
Figure 25:
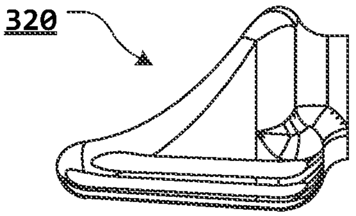
FIG. 25 illustrates a side view of an exemplary embodiment of a control button according to an exemplary embodiment of the present disclosure.
Figure 26:
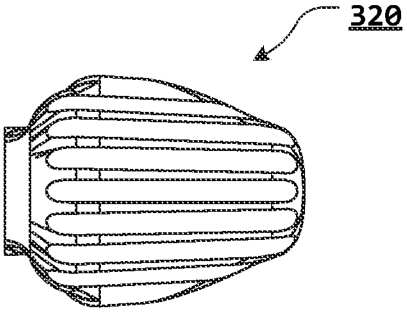
FIG. 26 illustrates a bottom view of an exemplary embodiment of a control button according to an exemplary embodiment of the present disclosure.

It should be appreciated that certain elements of the button assembly 110 may be formed as a monolithic or unitary body, a one-piece article, or an integral unit. For example, as illustrated in FIG. 14, the control button 120 and the activation disc 140 may optionally be formed as a single, integrally formed element. Alternatively, suitable materials can be used and sections or elements of the control button 120 and/or the activation disc 140 made independently and attached or coupled together, such as by adhesives, welding, screws, rivets, pins, or other fasteners, to form the various elements of the button assembly 110.

It should also be understood that the overall size and shape of the button assembly 110 and the various portions thereof, the control button 120, the activation disc 140, and the button housing 130, is a design choice based upon the desired functionality and/or appearance of the button assembly 110.

The button housing 130 includes a button housing body that extends from a button housing first end 131 to a button housing second end 132.

A button housing disc cavity 136 extends from the button housing second end 132 toward the button housing first end 131 to a button housing disc cavity shoulder 138. A button housing button cavity 134 extends from the button housing disc cavity shoulder 138 to the button housing first end 131. The button housing disc cavity shoulder 138 protrudes into the button housing disc cavity 136 to provide a reduced diameter aperture extending from the button housing disc cavity shoulder 138 to the button housing first end 131.

The button housing disc cavity 136 is substantially defined between an open portion extending from the button housing second end 132, one or more button housing disc cavity sidewalls 137, and the button housing disc cavity shoulder 138. The button housing disc cavity 136 may optionally be substantially round, when viewed from the button housing second end 132 and substantially cylindrical. The button housing disc cavity 136 is sized so as to allow the activation disc 140 to be positioned therein.

The button housing disc cavity shoulder 138 provides a smaller or reduced diameter, when compared to the outer diameter of the activation disc 140. Thus, the activation disc 140 may be positioned within the button housing disc cavity 136 such that at least a portion of the activation disc first end 141 of the activation disc 140 may contact the button housing disc cavity shoulder 138 such that the activation disc 140 is not permitted to pass beyond the button housing disc cavity shoulder 138, toward the button housing first end 131.

In certain exemplary, nonlimiting embodiments, the outer diameter of the activation disc 140 is less than the inner diameter of the button housing button cavity 134 at the button housing disc cavity shoulder 138. In this manner, the activation disc 140 is able to be inserted into the button housing disc cavity 136, through the button housing first end 131 and the button housing button cavity 134.

A button housing button cavity side wall 135 extends from the button housing first end 131, toward the button housing disc cavity shoulder 138. In various exemplary embodiments, the button housing button cavity side wall 135 comprises a conically tapered or countersunk sidewall.

In various exemplary embodiments, button housing 130 includes an at least partially externally threaded button housing portion 139 extending from the from the button housing second end 132 toward the button housing first end 131. The at least partially externally threaded button housing portion 139 may optionally be utilized to threadedly attach or couple the button housing 130 to a host. For example, the at least partially externally threaded button housing portion 139 may include external threads that may be threadedly attached or coupled to the at least partially internally threaded button cavity sidewall 165.

It should be appreciated that other means or methods may be used to attach or couple the button housing 130 to a switch housing 160 (or some other housing or device). Thus, the at least partially externally threaded button housing portion 139 is merely exemplary and not limiting. For example, the at least partially externally threaded button housing portion 139 may optionally be replaced with other attachment or coupling means or devices, such as, for example, a mating portion of a snap, quarter-turn engagement projection(s) or recess(es), one or more magnets, or any other known or later developed means or device for attaching or coupling the button housing 130 to a desired switch or housing.

When the elements of the button assembly 110 are attached or coupled together, the activation disc 140 is positioned within the button housing disc cavity 136. The control button neck portion 125 of the control button 120 extends from the button housing first end 131 into the button housing button cavity 134 and toward and into the button housing disc cavity 136 such that the activation disc 140 is attached or coupled to the control button 120, as described herein.

In this manner, the control button 120 and activation disc 140 are able to be repeatably slidable relative to the button housing 130 and the activation disc is able to be repeatably slidable within and relative to the button housing disc cavity 136.

Figure 8:
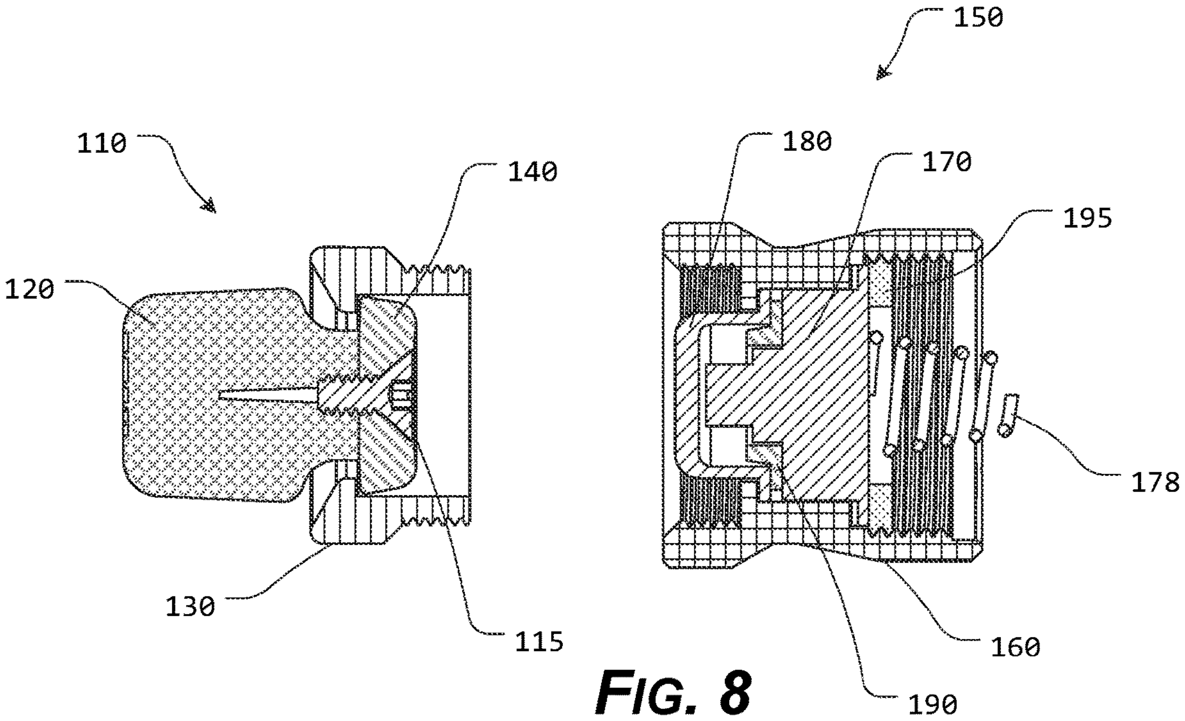
FIG. 8 illustrates a side, cross-sectional view of certain exemplary, aligned components of an exemplary embodiment of a multidirectional switch activation device according to the present disclosure.
Figure 9:
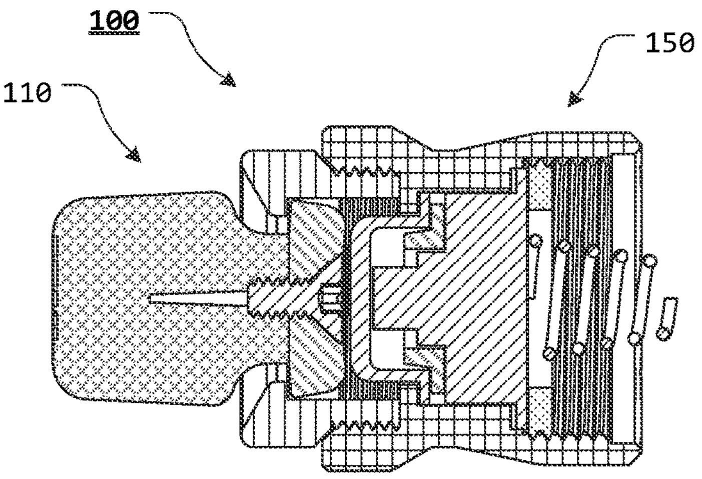
FIG. 9 illustrates a side, cross-sectional view of certain exemplary, assembled components of an exemplary embodiment of a multidirectional switch activation device according to the present disclosure.
Figure 10:
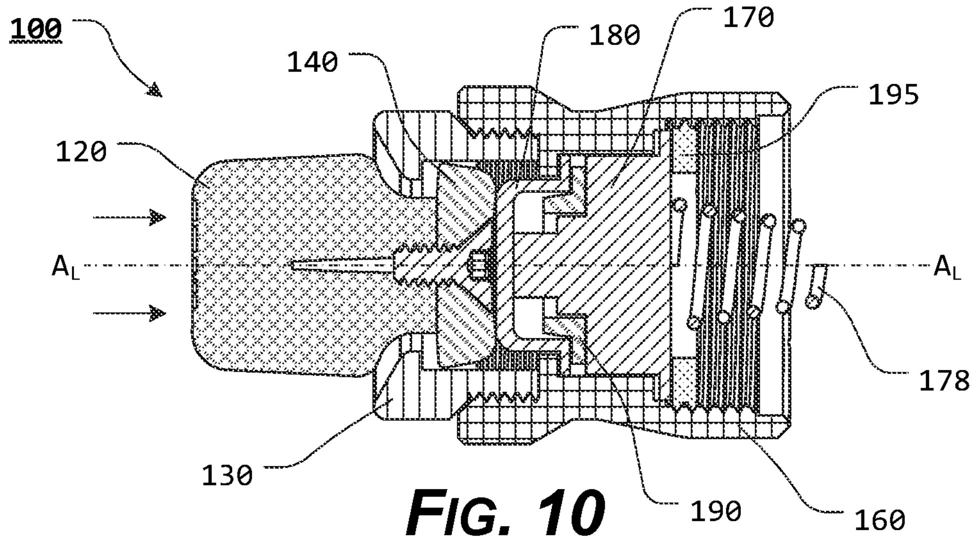
FIG. 10 illustrates a side, cross-sectional view of certain exemplary, assembled components of an exemplary embodiment of a multidirectional switch activation device, wherein the control button is in a frontward or forward engaged position according to the present disclosure.

If the control button 120 and activation disc 140 are positioned to such that at least a portion of the activation disc first end 141 of the activation disc 140 contacts or is proximate the button housing disc cavity shoulder 138, the control button 120 is in an "off" or deactivated position, as illustrated in FIG. 10. If the control button 120 and activation disc 140 are positioned to such that the activation disc first end 141 of the activation disc 140 is urged away from the button housing disc cavity shoulder 138, along the longitudinal axis, $A_L$, of the button assembly 110, and further into the button housing disc cavity 136 (toward the button housing second end 132), the control button 120 is in or moving toward an "on" or activated position, as illustrated in FIG. 8.

Figure 11:
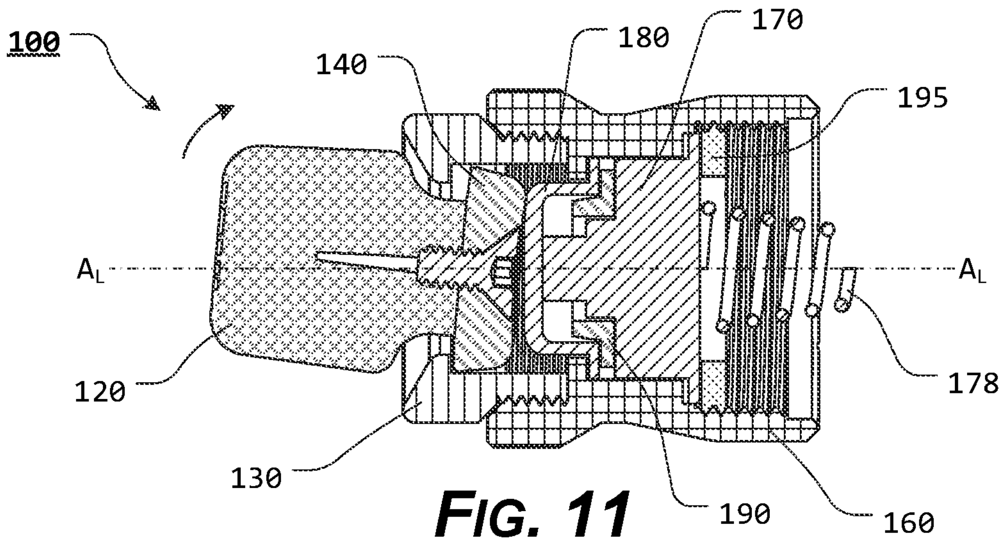
FIG. 11 illustrates a side, cross-sectional view of certain exemplary, assembled components of an exemplary embodiment of a multidirectional switch activation device, wherein the control button is in a sideward or laterally engaged position according to the present disclosure.
Figure 12:
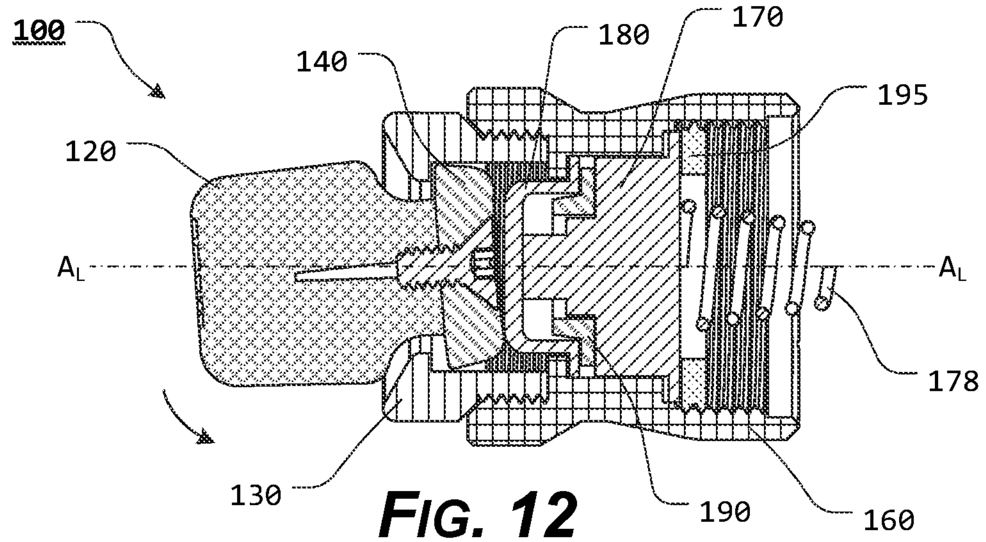
FIG. 12 illustrates a side, cross-sectional view of certain exemplary, assembled components of an exemplary embodiment of a multidirectional switch activation device, wherein the control button is in a sideward or laterally engaged position according to the present disclosure.
Figure 13:
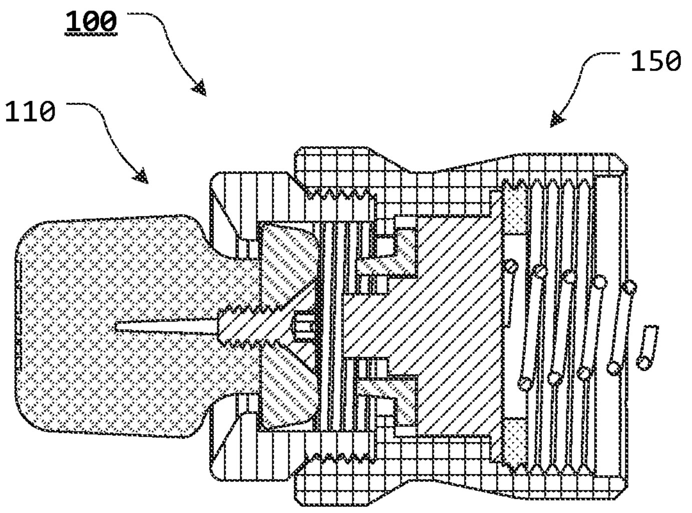
FIG. 13 illustrates a side, cross-sectional view of certain exemplary, assembled components of an exemplary embodiment of a multidirectional switch activation device according to the present disclosure.

If, as illustrated in FIGS. 11 and 12, the control button 120 is manipulated laterally or tilted relative to the longitudinal axis, $A_L$, of the button assembly 110, at least a portion of the activation disc second end 142 is urged away from the button housing disc cavity shoulder 138, along the longitudinal axis, $A_L$, of the button assembly 110, and further into the button housing disc cavity 136 (toward the button housing second end 132), so that the control button 120 is in or moving toward an "on" or activated position.

In various exemplary embodiments, the switch assembly 150, if included, optionally comprises at least some of a switch housing 160, a switch cover 180, a stabilizing collar 190, a switch 170, and a retaining ring 195.

The switch housing 160, if included, includes at least some of a switch housing body, which extends from a switch housing first end 161 to a switch housing second end 162. A switch housing switch cavity 166 extends from the switch housing second end 162 toward the switch housing first end 161 to a switch housing switch cavity shoulder 168. A switch housing button cavity 164 extends from the switch housing switch cavity shoulder 168 to the switch housing first end 161. The switch housing switch cavity shoulder 168 protrudes into the switch housing switch cavity 166 to provide a reduced diameter aperture extending from the switch housing switch cavity shoulder 168 to the switch housing first end 161.

The switch housing switch cavity 166 includes an at least partially internally threaded switch cavity sidewall 167, while the switch housing button cavity 164 includes an at least partially internally threaded button cavity sidewall 165.

In various exemplary embodiments, the switch 170 comprises a depressible push-button electrically attached or coupled to an integrated circuit that functions as a control switch for an attached or coupled device (not shown). In this manner, various functions of the attached or coupled device (not shown) may be driven and/or controlled by the switch 170. In various exemplary, non-limiting embodiments, the switch 170 optionally comprises a microprocessor-controlled switch. The switch 170 may be programmed and/or reprogrammed based on the specific functions and/or modes of an attached or coupled device (not shown).

The conical power supply contact 178 is electrically coupled to the switch 170 such that a terminal of a battery or other voltage source may be electrically coupled to the switch 170. When the switch assembly 150 is attached to an attached or coupled device (not shown), the switch 170 is electrically coupled to the attached or coupled device (not shown).

In various exemplary, nonlimiting embodiments, the switch cover 180 is a rubber or otherwise at least partially resilient cap that may optionally be included to provide a watertight or water resistant seal between a surface of switch housing 160 and the switch 170.

In various exemplary, nonlimiting embodiments, the stabilizing collar 190 is a rubber or otherwise at least partially resilient element that may optionally be included to engage at least a portion of a surface of the switch housing switch cavity 166 and at least a portion of the switch 170 to provide additional positioning, a watertight or water resistant seal, and/or vibration dampening between the switch housing 160 and the switch 170.

In various exemplary, nonlimiting embodiments, the retaining ring 195, if included, comprises an externally threaded ring having a retaining ring aperture 197 formed therethrough. The externally threaded portion of the retaining ring 195 correspond to the at least partially internally threaded switch cavity sidewall 167 of the switch housing switch cavity 166. Thus, when the switch 170 is positioned within the switch housing switch cavity 166 (with or without the optional switch cover 180 and/or stabilizing collar 190) the retaining ring 195 may be threadedly attached or coupled within the switch housing switch cavity 166, via interaction of the external threads of the retaining ring 195 and the internal threads of the at least partially internally threaded switch cavity sidewall 167 to position and maintain the switch 170 within switch housing switch cavity 166.

Figure 7:
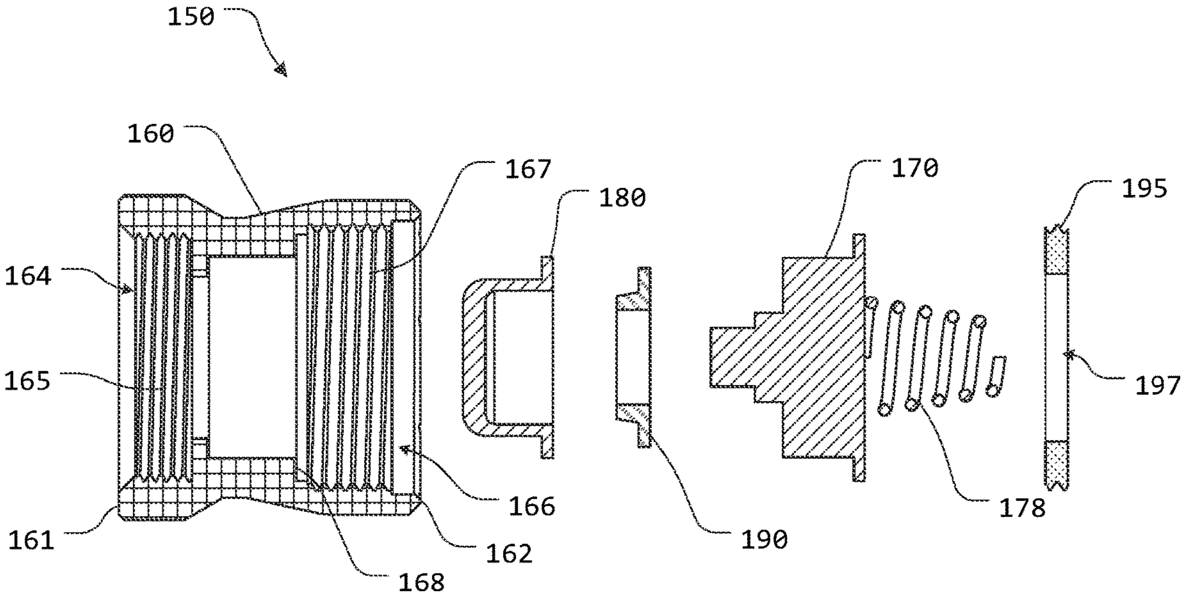
FIG. 7 illustrates an exploded, side, cross-sectional view of certain exemplary, aligned components of an exemplary embodiment of a switch assembly according to the present disclosure.

During assembly of the exemplary switch assembly 150, as illustrated most clearly in FIGS. 7 and 8, the switch cover 180 (if included), the stabilizing collar 190 (if included), and the switch 170 are positioned within the switch housing switch cavity 166. The retaining ring 195 is then used to secure each of these elements within the switch housing switch cavity 166. Once assembled, at least a portion of the at least partially internally threaded switch cavity sidewall 167 may be utilized to attach or couple the switch assembly 150 to a device such as, for example, a flashlight.

In various exemplary embodiments, various components of the multidirectional switch activation device 100 are substantially rigid and are formed of stainless steel. Alternate materials of construction of the various components of the multidirectional switch activation device 100 may include one or more of the following: steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the vario and us components of the multidirectional switch activation device 100 is a design choice based on the desired appearance and functionality of the multidirectional switch activation device 100.

It should be appreciated that certain elements of the multidirectional switch activation device 100 may be formed as a monolithic or unitary body, a one-piece article, or an integral unit (such as, for example, the button assembly 110 and the switch housing 160). Alternatively, suitable materials can be used and sections or elements made independently and attached or coupled together, such as by adhesives, welding, screws, rivets, pins, or other fasteners, to form the various elements of the multidirectional switch activation device 100.

It should also be understood that the overall size and shape of the multidirectional switch activation device 100 and the various portions thereof is a design choice based upon the desired functionality and/or appearance of the multidirectional switch activation device 100.

During use of the button assembly 110, whether in conjunction with the exemplary switch 170, the exemplary switch assembly 150, or an alternative switch assembly, the button assembly 110 is positioned adjacent the switch 170 (or an alternative switch) such that the activation disc second end 142 is positioned adjacent or against the switch 170 (or the alternative switch) as illustrated and described herein.

When a sufficient degree of force is applied to the control button 120, the control button 120 is urged or manipulated from the off or disengaged position to the on or engaged position, as described herein, the activation disc 140 provides a sufficient urging force to the switch 170 (or an alternative switch) to activate the switch 170 (or an alternative switch).

When a sufficient degree of force is removed from the control button 120, the biasing of the switch 170 (or an alternative switch) provides a measure of return force to the control button 120, to urge the control button 120 and the activation disc 140 from the on or engaged position to the off or disengaged position.

It should also be appreciated that a more detailed explanation of the specific dimensions of certain components of the multidirectional switch activation device 100 and/or the button assembly 110, instructions regarding how to install the multidirectional switch activation device 100 and/or the button assembly 110, methods for using the multidirectional switch activation device 100 and/or the button assembly 110, once installed, and certain other items and/or techniques necessary for the implementation and/or operation of the various exemplary embodiments of the present disclosure are not provided herein because such background information will be known to one of ordinary skill in the art. Therefore, it is believed that the level of description provided herein is sufficient to enable one of ordinary skill in the art to understand and practice the systems, methods, and apparatuses of the presentation, as described.

It should be appreciated that the multidirectional switch activation device of the present disclosure is not limited to the embodiment illustrated and described as the multidirectional switch activation device 100.

While the present disclosure has been described in conjunction with the exemplary embodiments outlined above, the foregoing description of exemplary embodiments of the present disclosure, as set forth above, are intended to be illustrative, not limiting and the fundamental disclosure should not be considered to be necessarily so constrained. It is evident that the present disclosure is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the present disclosure. The upper and lower limits of these smaller ranges may independently be included in the smaller ranges and is also encompassed within the present disclosure, subject to any specifically excluded limit in the stated range. Where the stated range includes one or both of the limits, ranges excluding either or both of those included limits are also included in the present disclosure.

It is to be understood that the phraseology of terminology employed herein is for the purpose of description and not of limitation. Unless defined otherwise, all technical and scientific terms used herein have the same meaning as commonly understood by one of ordinary skill in the art to which the present disclosure belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the present disclosure, such that others may, by applying current knowledge, change, vary, modify, and/or adapt these exemplary, non-limiting embodiments for various applications without departing from the spirit and scope of the present disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the present disclosure.

Also, it is noted that as used herein and in the appended claims, the singular forms “a”, “and”, “said”, and “the” include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as “solely”, “only”, and the like in connection with the recitation of claim elements or the use of a “negative” claim limitation(s).

What is claimed is:

1. A multidirectional switch activation device, comprising:

a control button, wherein a button head portion of said control button extends from a control button first end to a control button transition shoulder portion of said control button, wherein a control button transition shoulder portion of said control button extends from said button head portion to a control button neck portion, and wherein said control button neck portion extends from said control button transition shoulder portion to a control button second end;

an activation disc having an activation disc body, wherein said activation disc body extends from an activation disc first end to an activation disc second end, wherein said activation disc second end includes an arced or radiused surface, and wherein said control button second end is attached or coupled to at least a portion of said activation disc first end;

a button housing having a button housing body, wherein said button housing body extends from a button housing first end to a button housing second end, wherein a button housing disc cavity extends from said button housing second end to a button housing disc cavity shoulder, wherein a button housing button cavity extends from said button housing disc cavity shoulder to said button housing first end, wherein a button housing button cavity side wall extends from said button housing first end toward said button housing disc cavity shoulder, wherein said button housing disc cavity shoulder protrudes into said button housing disc cavity to provide a reduced diameter aperture extending from said button housing disc cavity shoulder to said button housing first end, wherein said activation disc is positioned within said button housing disc cavity such that at least a portion of said activation disc first end of said activation disc may contact said button housing disc cavity shoulder such that said activation disc is not permitted to pass beyond said button housing disc cavity shoulder, wherein said control button and said activation disc are repeatably slidable relative to said button housing and said activation disc is repeatably slidable within said button housing disc cavity between a deactivated position wherein at least a portion of said activation disc first end of said activation disc contacts or is proximate said button housing disc cavity shoulder and an activated position wherein said activation disc first end of said activation disc is urged away from said button housing disc cavity shoulder toward said button housing second end, and wherein said control button, said activation disc, and said button housing form a button assembly; and a switch housing including a switch, wherein said switch housing is attached or coupled to said button housing proximate said button housing second end such that if said control button and said activation disc are in said deactivated position said activation disc second end of said activation disc does not activate said switch and if said control button and said activation disc are in said activated position at least a portion of said activation disc second end of said activation disc activates said switch.

2. The multidirectional switch activation device of claim 1, wherein said button assembly converts lateral movement of said control button to forward movement of at least a portion of said activation disc.

3. The multidirectional switch activation device of claim 1, wherein said control button second end is attached or coupled to at least a portion of said activation disc first end via a fastener.

4. The multidirectional switch activation device of claim 1, wherein said control button includes one or more surface extensions, wherein each surface extension is formed so as to engage a portion of said button housing to restrict movement of said control button relative to said button housing.

5. The multidirectional switch activation device of claim 1, wherein said activation disc has a substantially circular cross-section.

6. The multidirectional switch activation device of claim 1, wherein said activation disc first end has a substantially planar surface.

7. The multidirectional switch activation device of claim 1, having two or more activation discs, each activation disc having a different characteristic or activation disc second end profile.

8. The multidirectional switch activation device of claim 1, wherein said activation disc second end extends to said activation disc first end.

9. The multidirectional switch activation device of claim 1, wherein said control button and said activation disc are formed as a single, integrally formed element, formed as a monolithic or unitary body, a one-piece article, or an integral unit.

10. The multidirectional switch activation device of claim 1, wherein at least a portion of said control button second end and at least a portion of said activation disc first end are attached or coupled together via an adhesive.

11. The multidirectional switch activation device of claim 1, wherein said button housing disc cavity is defined between an open portion extending from said button housing second end, one or more button housing disc cavity sidewalls, and said button housing disc cavity shoulder.

12. The multidirectional switch activation device of claim 1, wherein said button housing button cavity side wall comprises a conically tapered or countersunk sidewall.

13. The multidirectional switch activation device of claim 1, wherein movement of said control button parallel to a longitudinal axis of said button assembly urges at least a portion of said activation disc second end toward said button housing second end.

14. The multidirectional switch activation device of claim 1, wherein lateral movement of said control button relative to a longitudinal axis of said button assembly urges at least a portion of said activation disc second end toward said button housing second end.

15. The multidirectional switch activation device of claim 1, wherein said button assembly and said switch housing are formed as a monolithic or unitary body, a one-piece article, or an integral unit.

16. The multidirectional switch activation device of claim 1, wherein in said activated position at least a portion of said activation disc first end of said activation disc contacts said button housing disc cavity shoulder.

17. The multidirectional switch activation device of claim 1, wherein if said control button and said activation disc are in said deactivated position at least a portion of said activation disc second end of said activation disc contacts said switch.

18. The multidirectional switch activation device of claim 1, wherein a biasing force of said switch provides a measure of return force to said activation disc, to urge said control button and said activation disc to said disengaged position.

19. A multidirectional switch activation device, comprising:

a control button having a control button body, wherein said control button body extends from a control button first end to a control button second end;

an activation disc having an activation disc body, wherein said activation disc body extends from an activation disc first end to an activation disc second end, wherein said activation disc second end includes an arced or radiused surface, and wherein said control button second end is attached or coupled to at least a portion of said activation disc first end;

a button housing having a button housing body, wherein said button housing body extends from a button housing first end to a button housing second end, wherein a button housing disc cavity extends from said button housing second end to a button housing disc cavity shoulder, wherein a button housing button cavity extends from said button housing disc cavity shoulder to said button housing first end, wherein said button housing disc cavity shoulder protrudes into said button housing disc cavity, wherein said activation disc is positioned within said button housing disc cavity such that at least a portion of said activation disc first end of said activation disc may contact said button housing disc cavity shoulder, and wherein said control button and said activation disc are repeatably slidable relative to said button housing and said activation disc is repeatably slidable within said button housing disc cavity between a deactivated position wherein at least a portion of said activation disc first end of said activation disc contacts or is proximate said button housing disc cavity shoulder and an activated position wherein said activation disc first end of said activation disc is urged away from said button housing disc cavity shoulder toward said button housing second end; and a switch housing including a switch, wherein said switch housing is attached or coupled to said button housing proximate said button housing second end such that if said control button and said activation disc are in said deactivated position said activation disc second end of said activation disc does not activate said switch and if said control button and said activation disc are in said activated position at least a portion of said activation disc second end of said activation disc activates said switch.

20. A multidirectional switch activation device, comprising:

a control button having a control button body, wherein said control button body extends from a control button first end to a control button second end;

an activation disc having an activation disc body, wherein said activation disc body extends from an activation disc first end to an activation disc second end, and wherein said control button second end is attached or coupled to at least a portion of said activation disc first end; and a button housing having a button housing body, wherein said button housing body extends from a button housing first end to a button housing second end, wherein a button housing disc cavity extends from said button housing second end to a button housing disc cavity shoulder, wherein a button housing button cavity extends from said button housing disc cavity shoulder to said button housing first end, wherein said button housing disc cavity shoulder protrudes into said button housing disc cavity, wherein said activation disc is positioned within said button housing disc cavity such that at least a portion of said activation disc first end of said activation disc may contact said button housing disc cavity shoulder, and wherein said control button and said activation disc are repeatably slidable relative to said button housing between a deactivated position wherein at least a portion of said activation disc first end of said activation disc contacts or is proximate said button housing disc cavity shoulder and an activated position wherein at least a portion of said activation disc first end of said activation disc is urged away from said button housing disc cavity shoulder, and wherein at least a portion of said control button first end of said control button is repeatably manipulatable laterally relative to a longitudinal axis of said button housing such that lateral manipulation of said control button relative to said longitudinal axis of said button housing urges at least a portion of said first end of said activation disc away from said button housing disc cavity shoulder and urges at least a portion of said second end of said activation disc toward said button housing second end and said activated position.

* * * * *